(No Model.)
M. J. HINDEN.
HAND GRIP TESTER.
No. 300,473. Patented June 17, 1884.
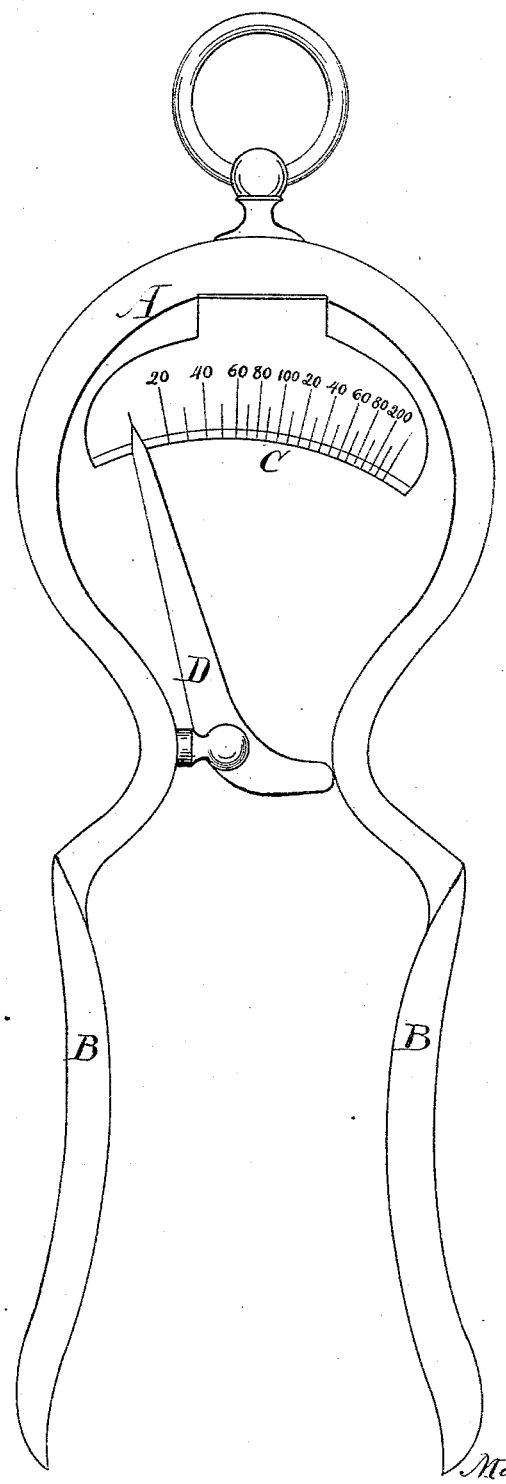
Witnesses,
F. R. Tibbitts.
E. W. Laird
Inventor,
Matthias J. Hinden,
per Geo. W. Tibbitts, Atty.

UNITED STATES PATENT OFFICE.

MATHIAS J. HINDEN, OF CLEVELAND, OHIO, ASSIGNOR OF ONE-HALF TO PETER DANENHAUER, OF SAME PLACE.

HAND-GRIP TESTER.

SPECIFICATION forming part of Letters Patent No. 300,473, dated June 17, 1884.

Application filed February 7, 1884. (No model.)

*To all whom it may concern:*

Be it known that I, MATHIAS J. HINDEN, of Cleveland, in the county of Cuyahoga and State of Ohio, have invented a new and Improved Hand-Grip Tester, of which the following is a specification.

This invention relates to a device for the purpose of testing and indicating the gripping-power of a man's hand; and it consists of a spring in the form of an arc or major portion of a ring whose ends terminate in suitable handles to be grasped together in one hand. The pressing together of said handles tests the strength of the hand or the gripping force of the hand. The device is provided with a scale graduated to indicate pounds pressure. One arm of said gripping device is provided with a pivoted pointer for pointing off on the scale the amount of force exerted by the hand of the person using it, the lower end of the pointer having a curved end which is pressed upon the opposite arm and moves the pointer on the scale.

In the accompanying drawing the figure is a side elevation of my grip-tester, full size.

A represents the arc forming the spring of my grip-testing device, the ends of which are bent and extended to form suitable handles, B B, parallel to each other. The grasping of these handles in the hand and forcing them together test the gripping-power of the hand. In the bow of the arc is attached a graduated scale, C, having figures marked thereon representing pounds.

To one arm of the device is attached by a pivotal joint a pointer, D, the long sharp end playing on said scale. The short end is bent or curved toward the opposite arm of the device, and in compressing the handles the pointer is moved along on the scale by contact of the short arm of the pointer with the approaching arms.

The device is provided on the top of the arc with a swiveled ring, by which it may be hung up when not wanted for use.

Having described my invention, I claim—

The hand-grip tester herein described, consisting of the arc A, having handles B B, the curved scale C, suspended in the arc A, and the pointer D, pivoted to one of said handles and operated upon by the opposite handle when pressed for recording the number of pounds pressure applied, as described.

MATHIAS J. HINDEN.

Witnesses:
GEO. W. TIBBITTS,
M. G. NORTON.